A. G. STEPHENSON.
TRUCK BRAKE.
APPLICATION FILED MAY 27, 1918.

1,303,608.

Patented May 13, 1919.
2 SHEETS—SHEET 1.

Inventor
A. G. Stephenson.
By
Attorney

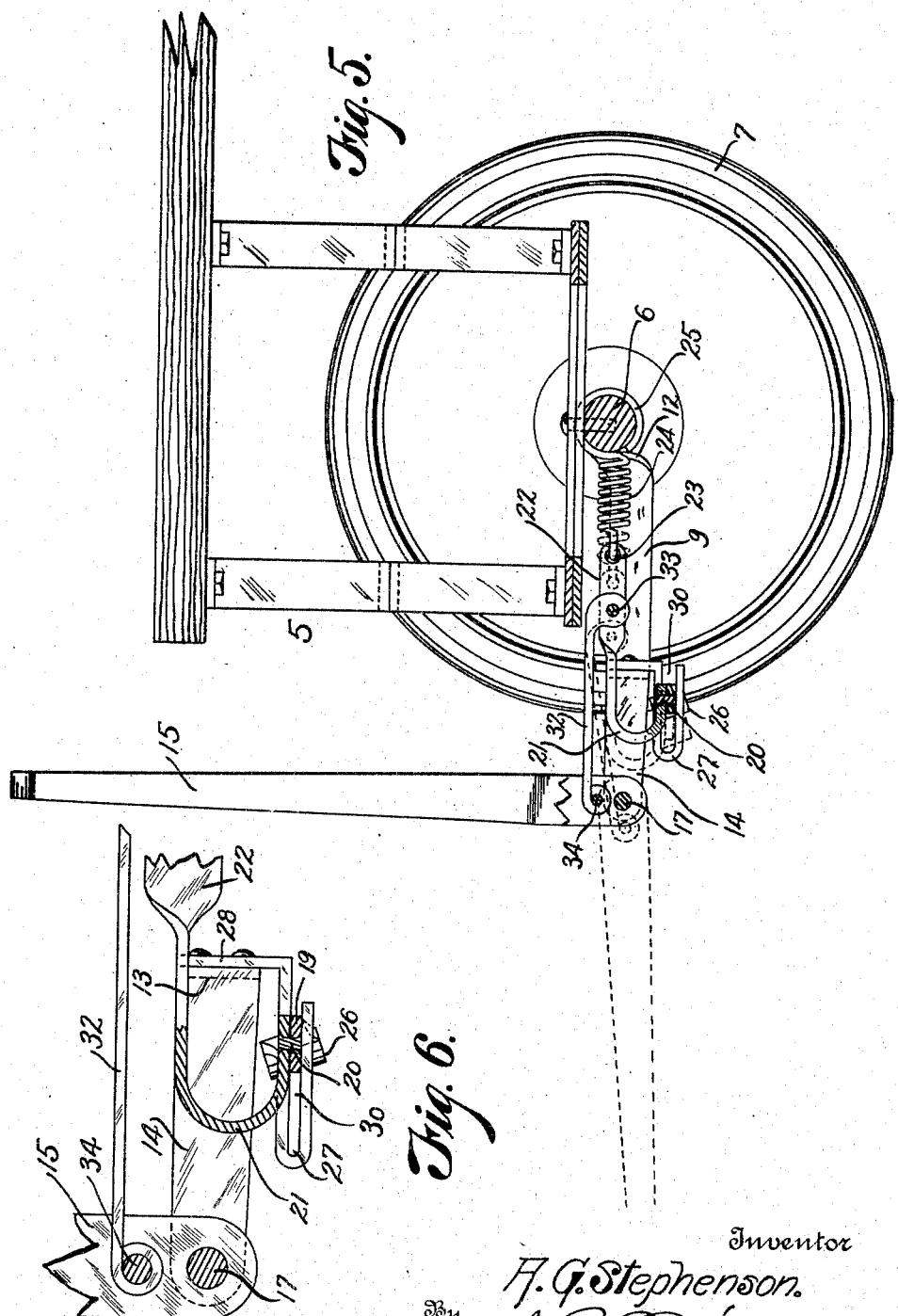

UNITED STATES PATENT OFFICE.

AXEL G. STEPHENSON, OF DENVER, COLORADO.

TRUCK-BRAKE.

1,303,608.   Specification of Letters Patent.   Patented May 13, 1919.

Application filed May 27, 1918. Serial No. 236,677.

*To all whom it may concern:*

Be it known that I, AXEL G. STEPHENSON, a citizen of the United States, residing at the city and county of Denver and State of Colorado, have invented certain new and useful Improvements in Truck-Brakes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in brakes, more especially adapted for use in connection with baggage trucks employed at railway stations, my object being to provide a device of this character which shall serve to automatically apply the brakes to the wheels of the truck and at the same time maintain the tongue or draft-handle of the truck in the raised position. Heretofore, much difficulty has been experienced by depot companies, due to the fact that trucks frequently run down inclines of platforms out onto the tracks resulting in wrecks. In my improved device, as soon as the truck is stopped, if the user is going to leave it, the brakes are under tension to automatically engage the tires of the front wheels, thus preventing accidents of the aforesaid character.

Furthermore, in my present improvement I embody what I term an equalizing feature. This is obtained by reason of the fact that I employ a single brake bar whose extremities are fashioned to form brake shoes adapted to engage the tires of the wheels. This brake bar is pivoted in the center so that if one of its extremities meets an abnormal obstruction on the tire of the adjacent wheel, the other brake shoe is adapted to engage the tire of its wheel and perform the braking function. This is an important improvement over those constructions wherein the two brake shoes move only in harmony or in a given plane parallel with a plane tangential to the tires of the wheels at the points which the brake shoes are adapted to engage.

The brake mechanism is combined with means for lifting and maintaining the tongue or draft-handle in the raised position, whereby it is entirely out of the way when the truck is stationary upon the platform.

Having briefly outlined my improvement, I will proceed to describe the same in detail, reference being made to the accompanying drawing, in which is illustrated an embodiment thereof. In this drawing:

Figure 1 is a top plan view of the front part of a truck equipped with my improved brake mechanism.

Figs. 2 and 3 are sections taken on the lines 2—2, and 3—3, respectively, of Fig. 1.

Fig. 5 is a view similar to Fig. 1 except that it is more nearly complete.

Fig. 6 is a section taken on the line 6—6, Fig. 4, the parts being shown on a larger scale.

The same reference characters indicate the same parts in all the views.

Figure 1:
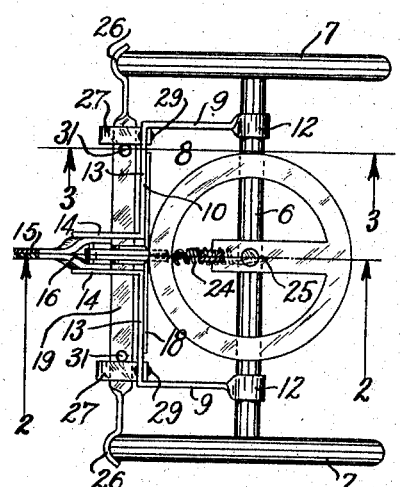
Figure 3:
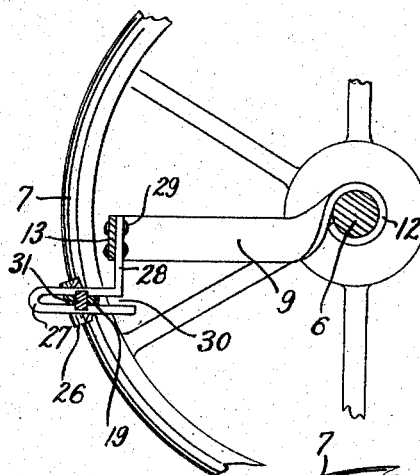

Let the numeral 5 designate the frame work of a truck, 6 the front axle and 7 the wheels thereof. Supported upon the axle is a U-shaped frame 8 composed of spaced parallel arms 9 and a front connecting member 10 which forms right angles with the said arms, the latter being secured to the axle, as shown at 12. The part 10 is composed of two parts 13 whose inner extremities merge into forwardly extending parts 14 which are spaced to receive the rear extremity of the tongue 15 which is bifurcated as shown at 16, and connected with the parts 15 by a pivot pin 17. The part 10 of the U-shaped frame is further provided with a reinforcing member 18 which bridges in the rear the space between the two parts 14 of the frame and extends for a considerable distance on opposite sides of said parts. Arranged below the frame 8 is a brake bar 19 which is pivotally connected, as shown at 20, with the forward hook-shaped extremity 21 of a reciprocating arm 22 whose rear extremity is floating and is connected, as shown at 23, with the forward end of a spiral spring 24, the rear extremity 25 of said spring being connected with the central part of the axle 6 of the truck or other vehicle. The pivotal connection between the brake bar and hook 21, is at the lower end thereof, the hook being formed by bending the forward end of the arm downwardly and rearwardly. The opposite extremities of the brake bar 19 are shaped, as shown at 26, to fit or approximately fit the tires of the wheels 7. Between these parts 26 and the central pivot 20, the brake bar is supported by guide loops 27 which are provided with upright parts 28 which are secured to the parts 13 of the frame 8, as shown at 29. The loops 27 are open at the rear, as shown at 30, to permit the entrance and removal of the bar when assembling or disassembling the parts of the brake mechanism. In order to avoid any tendency to an endwise movement or thrust of the brake bar, the latter is provided with stops 31 arranged in suitable proximity to the guide loops 27, the said stops preferably extending both above and below the bar in order to engage both the upper and lower parts of the loop to prevent endwise movement.

Figure 2:
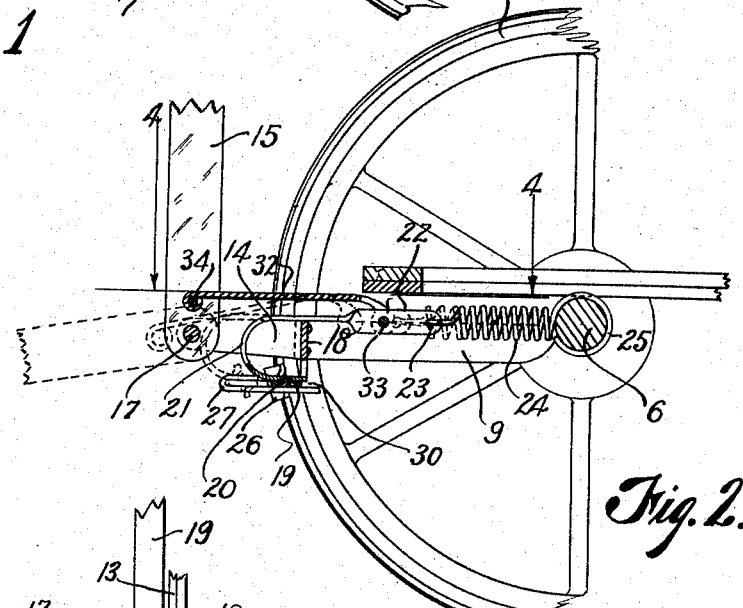
Figure 4:
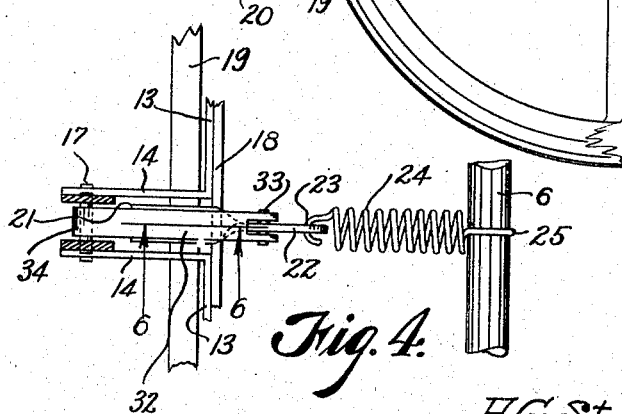
Fig. 4 is a fragmentary section taken on the line 4—4, Fig. 2.

The arm 22 is connected with the tongue 15 of the vehicle by a link 32 whose rear extremity is pivotally connected with the rear portion of the arm 22, as shown at 33, and whose forward portion is pivotally connected with the tongue, as shown at 34, beyond the pivot 17 which connects the tongue with the parts 14 of the U-shaped frame. The spring 24 is normally under tension to hold the brake shoe extremities of the bar 19 against the tires of the wheels 7 and to maintain the tongue 15 in the raised position, as shown by full lines in Figs. 2 and 5. However, as the tongue is lowered to the dotted line position in these views, the portion of the tongue between the centers of the pivots 17 and 34 serves as a crank arm to move the link 32 and the arm 22 forwardly to the dotted line position in the said views and if desired, so that the centers of the pivots 33, 34 and 17 will be in a straight line or dead center position, so that the tongue or draft-handle will be temporarily locked in the down position, or this construction may be such that the center of the pivot pin 34 will always be somewhat above the center of the pivot 17 so that as soon as the tension is released, the tongue of the spring 24 will serve to move the arm 20, the brake bar 19 and the link 32 to their rearward position, whereby the tongue is thrown to the raised position. The construction is capable of adaptation for either use as may be desired by a slight change of construction. Where the three pivot points are in the dead center position when the tongue is down so that the latter will remain in such position, as soon as it is desired to apply the brakes and raise the tongue, it is only necessary for the operator to raise the tongue slightly, after which the tension of the spring coöperating with its connections will serve to move the brake bar into the brake setting position and the tongue to the raised position as will be readily understood from the construction and arrangement of parts heretofore explained.

Having thus described my invention, what I claim is:

1. The combination in brake mechanism of the class described, of a reciprocable support, a brake bar whose central portion is mounted on said support, the extremities of the bar being adapted to engage the wheels of the vehicle in braking relation, a spring connecting said support with a stationary part of the vehicle, a stationary support, a tongue pivoted on said last named support, and an operative connection between the tongue and the movable support to raise the tongue as the brake bar is moved toward the wheels of the vehicle for braking purposes.

2. The combination with a vehicle, of a spring-actuated member, a brake bar centrally pivoted on said member, a stationary frame mounted on the vehicle, a tongue pivoted on the frame, means carried by said frame for supporting and guiding the end portions of the brake bar, and a link connected at one end with the spring-actuated member and at the other end with the tongue for raising the latter simultaneously with the movement of the brake bar into the braking position and whereby, as the tongue is lowered, the movement of the brake bar will be reversed.

3. The combination with a vehicle of a movable member having one end floating, a spring connecting said floating end with a stationary part of the vehicle, a brake bar having its central portion mounted on the other end of said member and having its ends adapted to engage the wheels of the vehicle in braking relation, a stationary support, a tongue pivoted to said support and a link having one end connected to said tongue and the other end connected to said member.

In testimony whereof I affix my signature.

AXEL G. STEPHENSON.

Copies of this patent may be obtained for five cents each, by addressing the "Commissioner of Patents, Washington, D. C."